(12) United States Patent
Klier et al.

(10) Patent No.: US 8,874,306 B2
(45) Date of Patent: Oct. 28, 2014

(54) FAST DETECTION OF ERROR CONDITIONS IN VEHICLE VACUUM SENSORS FOR A HYDRAULIC BOOST COMPENSATION SYSTEM

(75) Inventors: Willy Klier, Bloomfield Hills, MI (US); Kenta Mineo, Novi, MI (US); Scott Amenson, Dublin, OH (US)

(73) Assignee: Robert Bosch GmbH, Stuttgart (DE)

( * ) Notice: Subject to any disclaimer, the term of this patent is extended or adjusted under 35 U.S.C. 154(b) by 251 days.

(21) Appl. No.: 13/440,374

(22) Filed: Apr. 5, 2012

(65) Prior Publication Data

US 2012/0259506 A1   Oct. 11, 2012

Related U.S. Application Data

(60) Provisional application No. 61/471,787, filed on Apr. 5, 2011.

(51) Int. Cl.
*B60T 8/88* (2006.01)
*B60T 17/22* (2006.01)

(52) U.S. Cl.
CPC ........... *B60T 17/22* (2013.01); *B60T 2270/406* (2013.01); *B60T 8/885* (2013.01)
USPC .............................................. 701/32; 701/1

(58) Field of Classification Search
CPC .... G06Q 10/06; G01B 7/315; G07C 75/0858; B60R 16/0234; G01M 13/02
USPC .......................................................... 701/32
See application file for complete search history.

(56) References Cited

U.S. PATENT DOCUMENTS

| | | | | |
|---|---|---|---|---|
| 5,725,291 | A * | 3/1998 | Michels | 303/125 |
| 6,062,656 | A * | 5/2000 | Unterforsthuber et al. | 303/122.09 |
| 6,253,656 | B1 * | 7/2001 | Gilles | 91/367 |
| 6,318,815 | B1 * | 11/2001 | Haupt et al. | 303/113.4 |
| 6,322,164 | B1 | 11/2001 | Sakamoto et al. | |
| 6,422,122 | B1 * | 7/2002 | Linden et al. | 91/367 |
| 6,434,933 | B1 * | 8/2002 | Oishi et al. | 60/547.1 |
| 6,672,687 | B2 * | 1/2004 | Nishio | 303/122.09 |
| 7,082,869 | B2 * | 8/2006 | Borsch | 91/1 |
| 7,267,412 | B2 * | 9/2007 | Gronau et al. | 303/114.3 |
| 2003/0205127 | A1 * | 11/2003 | Borsch | 91/1 |
| 2003/0213239 | A1 * | 11/2003 | Borsch | 60/545 |
| 2004/0160119 | A1 * | 8/2004 | Wagner et al. | 303/114.3 |
| 2004/0243290 | A1 * | 12/2004 | Schmidt et al. | 701/34 |
| 2010/0161191 | A1 * | 6/2010 | Kato et al. | 701/70 |

FOREIGN PATENT DOCUMENTS

| | | |
|---|---|---|
| JP | 2010100271 | 5/2010 |
| JP | 2010116069 | 5/2010 |
| JP | 2010143543 | 7/2010 |

\* cited by examiner

*Primary Examiner* — Ian Jen
(74) *Attorney, Agent, or Firm* — Michael Best & Friedrich LLP

(57) ABSTRACT

Systems and methods of monitoring redundant vacuum sensors in the same vacuum chamber of a braking system to determine when an error condition is present in a braking system. The braking system includes a first sensor positioned in a chamber of the braking system and a second sensor positioned in the same chamber. A first reading is received from the first sensor and a second reading is received from the second sensor. A difference between the first reading and the second reading is determined. An error condition is indicated when the difference between the first reading and the second reading is greater than a threshold.

20 Claims, 2 Drawing Sheets

FAST DETECTION OF ERROR CONDITIONS IN VEHICLE VACUUM SENSORS FOR A HYDRAULIC BOOST COMPENSATION SYSTEM

CROSS-REFERENCE TO RELATED APPLICATIONS

This application claims priority to U.S. Provisional Application No. 61/471,787, filed Apr. 5, 2011, and titled "FAST DETECTION OF ERROR CONDITIONS IN VEHICLE VACUUM SENSORS FOR A HYDRAULIC BOOST COMPENSATION SYSTEM," the entirety of which is incorporated herein by reference.

BACKGROUND

The present invention relates to methods of detecting an error condition in systems with redundant sensors. In particular, embodiments of the present invention related to detecting error conditions in a hydraulic boost compensation braking system by monitoring two vacuum sensors.

SUMMARY

The invention provides a method for determining when an error condition is present in a system that includes at least two redundant sensors for detecting the error condition. In one embodiment, the system includes at least two vacuum sensors for monitoring a braking system that includes hydraulic boost compensation functionality. A processor receives a plurality of readings from each of the two vacuum sensors and performs a plurality of calculations to determine if an error condition is present. These calculations may include comparing the gradient (or rate of change) of a difference between the readings from the two sensors to a first threshold, determining whether the difference between the readings from the two sensors exceeds a second threshold for a predetermine period of time, and determining whether the time integral of the difference between the readings from the two sensors exceeds a threshold. If any of the plurality of calculations indicates an error condition, the processor determines that the error condition exists.

In another embodiment, the invention provides a method of determining when an error condition is present in a braking system. The braking system includes a first sensor positioned in a chamber of the braking system and a second sensor positioned in the same chamber. A first reading is received from the first sensor and a second reading is received from the second sensor. A difference between the first reading and the second reading is determined. An error condition is indicated when the difference between the first reading and the second reading is greater than a threshold.

In another embodiment, the invention provides a hydraulic boost compensation system including a vacuum chamber, a first vacuum sensor positioned in the vacuum chamber, and a second vacuum sensor positioned in the vacuum chamber. A controller receives a first reading from the first vacuum sensor and a second reading from a second vacuum sensor. The controller determines a difference between the first reading and the second reading and indicates that an error condition is detected when the difference is greater than a threshold.

In yet another embodiment, the invention provides a controller for a braking system. The braking system includes a vacuum chamber, a first sensor positioned in the vacuum chamber and a second sensor positioned in the vacuum chamber. The controller includes a processor and a memory storing instructions. When the instructions are executed by the processor, the controller receives a first reading from the first vacuum sensor and a second reading from the second vacuum sensor. The controller then calculates a sensor reading difference and a rate of change of the sensor reading difference. The controller indicates a first error condition when the rate of change of the sensor reading difference remains above a gradient threshold for a first defined period of time. The controller then compares the sensor reading difference to a first difference threshold and indicates that a second error condition is detected when the sensor reading difference remains above the first difference threshold for a second defined period of time. The controller then adds the difference between the sensor reading difference and the first difference threshold to a running sum of previous difference thresholds. The controller indicates a third error condition when the running sum of previous differences exceeds a sum difference threshold. However, the sum of previous threshold differences is reset when the sensor reading difference remains below a second difference threshold for a third defined period of time.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
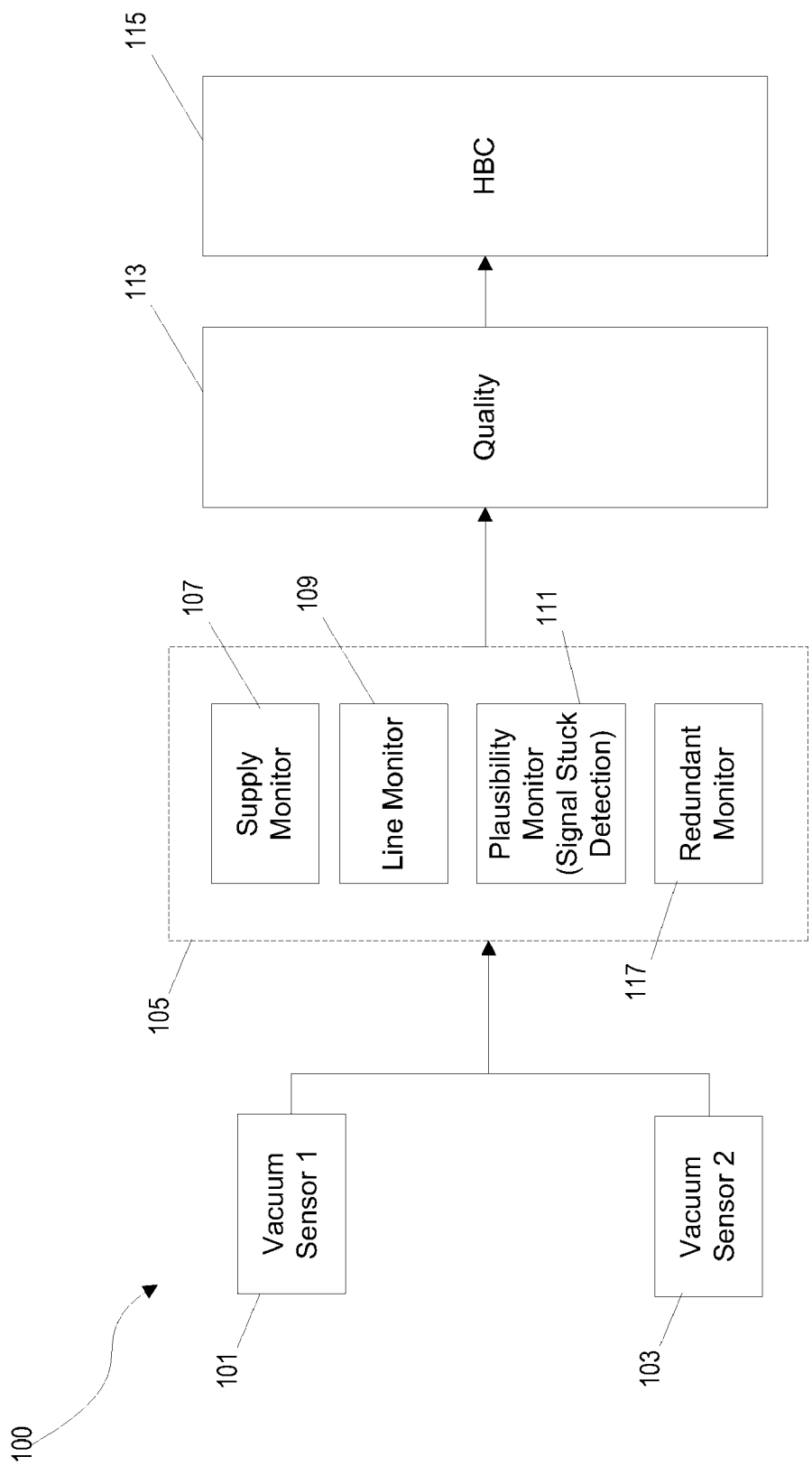
FIG. 1 is a block diagram of an error detection system.

As illustrated in FIG. 1, the system 100 includes two vacuum sensors 101, 103 for hydraulic boost compensation (HBC) control of a braking system controller 105. In some constructions, the braking system controller 105 includes a processor and a memory. The memory stores software modules in the form of instructions that are executed by the processor. The braking system controller 105 includes software modules that monitor supply (module 107), line (module 109), and plausibility (modules 111) factors of the signals from the two vacuum sensors 101, 103 before assessing the quality of the sensed variable (module 113) and then operating the HBC control (module 115).

The system also includes a redundant check (module 117) to monitor for errors or malfunctions in one of the vacuum sensors. The redundant check 117 compares the signals from both vacuum sensors for amplitude, gradient, and time-integral level to detect a vacuum sensor malfunction before the deviation causes an undesired vehicle behavior. By monitoring for deviations in these three variables, the system is able to detect small errors that were previously undetectable.

Although the system illustrated in FIG. 1 includes multiple software modules executed by a single controller, other constructions can include, for example, one or more ASICs, multiple software-based controllers, or a combination.

Figure 2:
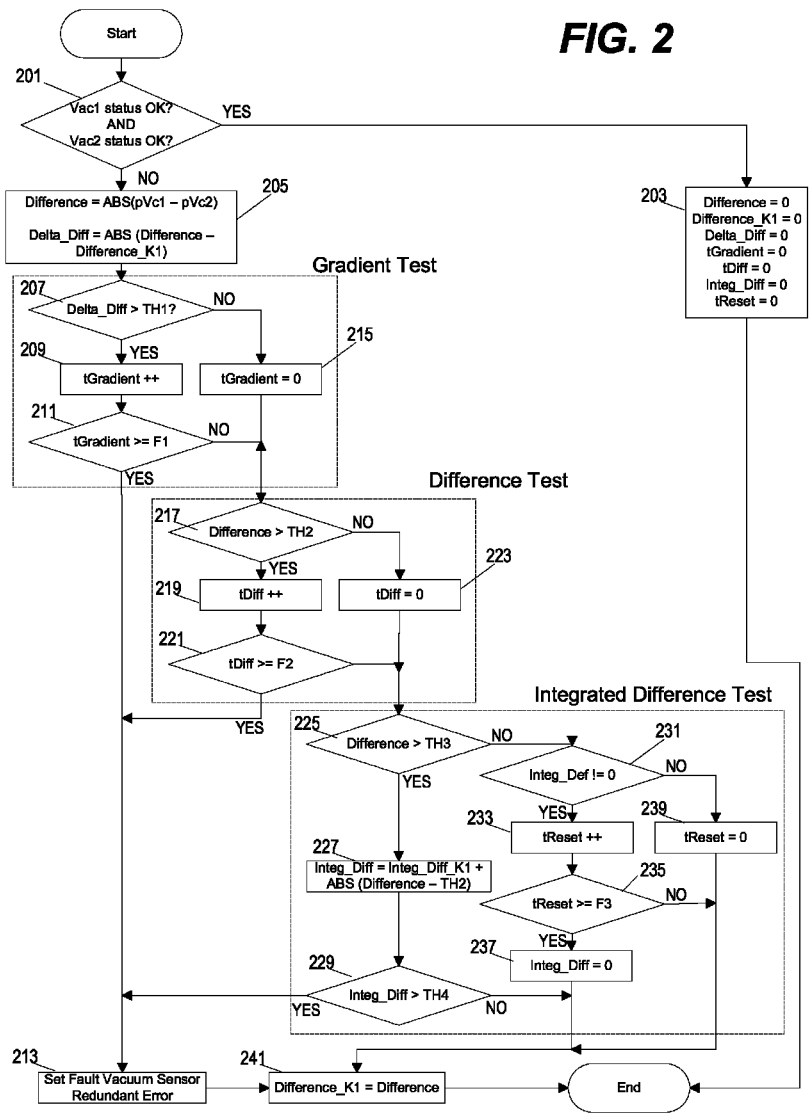
FIG. 2 is a flow chart illustrating a method of detecting an error condition using the system of FIG. 1.

FIG. 2 illustrates the method of performing the redundant check in detail. If the status of both vacuum sensors is positive ("OK") (step 201), the controller determines that the system is operating properly and resets all of the tracking variables (step 203) used in the redundant check. However, if one or both of the vacuum sensors indicates an adverse conditions, the controller then calculates the difference between the values measured by the two sensors (difference) and the rate of change (or gradient) of the difference over time (Delta_Diff) (step 205).

The first check performed by the controller is the gradient test. The rate of change of the sensor reading difference is compared to a gradient threshold (TH1) (step 207). If the rate of change exceeds the threshold a gradient counter is incremented (step 209). If the gradient counter exceeds a time threshold (F1), the controller determines that the rate of change has exceeded the gradient threshold for a defined period of time and indicates that a fault has been detected (step 213). However, if the rate of change is lower than the gradient threshold, the gradient counter is reset to zero (step 215) and the controller proceeds to the difference test.

In the difference test, the controller looks to the magnitude of the difference between the readings for the two sensors to detect an error conditions. The controller compares the sensor reading difference to a first difference threshold (TH2) (step 217). If the sensor reading difference exceeds the first difference threshold, a difference test counter is incremented (step 219). If the difference test counter exceeds a time threshold (F2) (step 221), the controller determines that the sensor reading difference has remained above a threshold for a second defined period of time and indicates that a fault has been detected (step 213). However, if the sensor reading difference falls below the first difference threshold (TH2), the controller resets the difference test counter to zero (step 223) and proceeds to the integrated difference test.

In the integrated difference test, the controller evaluates the time-integral difference of the signals. The controller begins the integrated difference test by comparing the sensor reading difference to a second difference threshold (TH3) (step 225). If the sensor reading difference exceeds the second threshold, the controller calculates the difference between the sensor difference and the first threshold and adds that value to a running sum of previous threshold differences (Integ_Diff) (step 227). When the running sum of previous threshold differences exceeds a threshold (TH4) (step 229), the controller indicates that a fault has been detected (step 213). However, if the sensor reading difference is less than the second difference threshold (TH3), the controller evaluates how long the sensor reading difference has remained below the threshold in order to determine when to reset the running sum of previous differences to zero.

If the sensor reading difference is below the second difference threshold (step 225) and the running sum of previous threshold differences is not equal to zero (step 231), the controller increments an integrated difference test counter (step 233). If the integrated difference test counter exceeds a time threshold (F3) (step 235), the controller determines that the sensor reading difference has remained below the second difference threshold for a third defined period of time and resets the running sum of previous threshold differences to zero (step 237). If, however, the sensor reading difference is below the second difference threshold (step 225) and the running sum of previous threshold differences is equal to zero (step 231), the controller determines that the sensor reading difference has just fallen below the second difference threshold (TH3) and, therefore, resets the integrated difference test counter to zero (step 239).

After the controller has either detected a fault (step 213) or passed through all three tests without detecting a fault, the controller stores the current sensor reading difference ("Difference") as a previous sensor reading difference ("Difference_K1").

FIG. 2 uses the notation K1 to indicate a value of a variable from a previous iteration of the method illustrated in FIG. 2. Furthermore, the various thresholds and defined testing time periods are determined based on factors that are evaluated during testing or are adjusted during operation of the vehicle. These factors include the maximum deviation between the two signals that can exist without causing an undesired vehicle behavior and the acceptable duration for which the deviation between the two signals can be allowed to occur without causing an undesired vehicle behavior.

Although the time periods for the tests illustrated in FIG. 2 are the same, in some constructions of the system, the defined time periods can be different. Furthermore, although FIG. 2 illustrates each test being performed serially, in other embodiments, it is possible to perform these three or other tests in a different order or in parallel.

Thus, the invention provides, among other things, systems and methods for determining when an error condition is present in a system that includes at least two redundant sensors for detecting the error condition. Various features and advantages of the invention are set forth in the following claims.

What is claimed is:

1. A method of determining when an error condition is present in a braking system, the braking system including a first sensor positioned in a chamber of the braking system and a second sensor positioned in the same chamber of the braking system, the method comprising:
    receiving a first reading from the first sensor in the chamber of the braking system;
    receiving a second reading from the second sensor in the chamber of the braking system;
    determining a difference between the first reading and the second reading; and
    indicating that an error condition is detected when the difference between the first reading and the second reading is greater than a threshold.

2. The method of claim 1, wherein the act of indicating that an error condition is detected further includes indicating that an error condition is detected only when the difference between the first reading and the second reading remains greater than the threshold for a defined period of time.

3. The method of claim 1, further comprising:
    calculating a rate of change of the difference between the first reading and the second reading; and
    indicating that a second error condition is detected when the rate of change of the difference between the first reading and the second reading is greater than a gradient threshold.

4. The method of claim 1, further comprising:
    calculating a rate of change of the difference between the first reading and the second reading;
    determining when the rate of change of the difference between the first reading and the second reading is greater than a gradient threshold; and
    indicating that an error condition is detected when the rate of change of the difference between the first reading and the second reading remains above the gradient threshold for a defined period of time.

5. The method of claim 1, further comprising:
    calculating an integral of the difference between the first reading and the second reading over time; and
    indicating that an error condition is detected when the integral of the difference exceeds an integral threshold.

6. The method of claim 1, further comprising:
- determining a threshold difference between the threshold and the difference between the first reading and the second reading;
- adding the threshold difference to a sum of previous threshold differences;
- indicating that an error condition is detected when the sum of previous threshold differences exceeds a sum difference threshold; and
- resetting the sum of previous threshold differences to zero when the difference between the first reading and the second reading remains below a second difference threshold for a defined period of time.

7. A hydraulic boost compensation system comprising:
- a vacuum chamber of a braking system;
- a first vacuum sensor positioned in the vacuum chamber;
- a second vacuum sensor positioned in the vacuum chamber;
- a controller configured to
  - receive a first reading from the first sensor in the vacuum chamber of the braking system;
  - receive a second reading from the second sensor in the vacuum chamber of the braking system;
  - determine a difference between the first reading and the second reading; and
  - indicate that an error condition is detected when the difference between the first reading and the second reading is greater than a threshold.

8. The hydraulic boost compensation system method of claim 7, wherein the controller is configured to indicate that an error condition is detected by indicating that an error condition is detected only when the difference between the first reading and the second reading remains greater than the threshold for a defined period of time.

9. The hydraulic boost compensation system method of claim 7, wherein the controller is further configured to
- calculate a rate of change of the difference between the first reading and the second reading; and
- indicate that an error condition is detected when the rate of change of the difference between the first reading and the second reading is greater than a gradient threshold.

10. The hydraulic boost compensation system method of claim 7, wherein the controller is further configured to
- calculate a rate of change of the difference between the first reading and the second reading;
- determine when the rate of change of the difference between the first reading and the second reading is greater than a gradient threshold; and
- indicate that an error condition is detected when the rate of change of the difference between the first reading and the second reading remains above the gradient threshold for a defined period of time.

11. The hydraulic boost compensation system method of claim 7, wherein the controller is further configured to
- calculate an integral of the difference between the first reading and the second reading over time; and
- indicating that an error condition is detected when the integral of the difference exceeds an integral threshold.

12. The hydraulic boost compensation system method of claim 7, wherein the controller is further configured to
- determine a threshold difference between the threshold and the difference between the first reading and the second reading;
- add the threshold difference to a sum of previous threshold differences;
- indicate that an error condition is detected with the sum of previous threshold differences exceeds a sum difference threshold; and
- reset the sum of previous threshold differences to zero when the difference between the first reading and the second reading remains below a second difference threshold for a defined period of time.

13. A controller for a braking system, the braking system including a vacuum chamber, a first vacuum sensor positioned in the vacuum chamber, and a second vacuum sensor positioned in the vacuum chamber, the controller including a processor and a memory storing instructions that, when executed by the processor, cause the controller to:
- receive a first reading from the first vacuum sensor;
- receive a second reading from the second vacuum sensor;
- calculate a sensor reading difference, the sensor reading difference being the difference between the first reading and the second reading;
- calculate a rate of change of the sensor reading difference over time;
- indicate that a first error condition is detected when the rate of change of the sensor reading difference remains above a gradient threshold for a first defined period of time;
- compare the sensor reading difference to a first difference threshold;
- indicate that a second error condition is detected when the sensor reading difference remains above the first difference threshold a second defined period of time;
- add the difference between the sensor reading difference and the first difference threshold to a sum of previous threshold differences;
- indicating that a third error condition is detected when the sum of previous differences exceeds a sum difference threshold; and
- resetting the sum of previous threshold differences when the sensor reading difference remains below a second difference threshold for a third defined period of time.

14. The controller of claim 13, wherein the first difference threshold is equal to the second difference threshold.

15. The controller of claim 13, wherein the first defined time period is equal to the second defined time period and the third defined time period.

16. The controller of claim 13, wherein the first sensor and the second sensor are redundant, and wherein the first, second and third error conditions are for the first and second sensors positioned in the vacuum chamber.

17. The method of claim 1, wherein the error condition is for the first and second sensors positioned in the same chamber, the chamber comprising a vacuum chamber.

18. The method of claim 1, wherein the first sensor and the second sensor are redundant.

19. The system of claim 7, wherein the error condition is for the first and second sensors positioned in the vacuum chamber.

20. The system of claim 7, wherein the first vacuum sensor and the second vacuum sensor are redundant.

* * * * *